United States Patent [19]
Hilger et al.

[11] Patent Number: 4,576,981
[45] Date of Patent: Mar. 18, 1986

[54] ADHESIVE COMPOSITION

[75] Inventors: Manfred Hilger, Konz; Günter Hultzsch; Roman Keiper, both of Wiesbaden, all of Fed. Rep. of Germany

[73] Assignee: Hoechst Aktiengesellschaft, Frankfurt am Main, Fed. Rep. of Germany

[21] Appl. No.: 603,684

[22] Filed: Apr. 25, 1984

[30] Foreign Application Priority Data

May 2, 1983 [DE] Fed. Rep. of Germany ....... 3315977

[51] Int. Cl.$^4$ ............... C08L 67/02; C08L 27/08; C08J 7/04; C08J 5/18
[52] U.S. Cl. ........................ 524/40; 524/37; 524/38; 524/39; 524/41; 525/166; 525/169; 156/328; 156/333; 427/412.5; 430/61; 430/176
[58] Field of Search ............... 524/37, 38, 39, 40, 524/41, 261, 264, 268; 525/165, 166, 169, 175; 156/328, 333; 427/412.5; 430/61, 96, 176

[56] References Cited

U.S. PATENT DOCUMENTS

| 4,048,252 | 9/1977 | Behmel ............................ 525/443 |
| 4,139,506 | 2/1979 | Thoese et al. ..................... 428/480 |
| 4,205,989 | 6/1980 | Moriya et al. ..................... 430/526 |
| 4,268,610 | 5/1981 | Roos ................................. 430/920 |
| 4,304,851 | 12/1981 | McGrail et al. .................... 430/533 |
| 4,457,997 | 6/1984 | Thoese et al. ..................... 430/911 |

FOREIGN PATENT DOCUMENTS

| 971996 | 4/1959 | Fed. Rep. of Germany . |
| 2555783 | 5/1979 | Fed. Rep. of Germany . |
| 2830003 | 9/1982 | Fed. Rep. of Germany . |
| 700957 | 12/1953 | United Kingdom . |
| 1568468 | 5/1980 | United Kingdom . |

*Primary Examiner*—John Kight
*Assistant Examiner*—Nathan M. Nutter
*Attorney, Agent, or Firm*—Schwartz, Jeffery, Schwaab, Mack, Blumenthal & Evans

[57] ABSTRACT

The invention relates to an adhesive composition which is suitable for use on a shaped part of polyester, in particular a polyester film, and comprises a copolyester, optionally in combination with light-sensitive substances, fillers and pigments, whereby the copolyester additionally contains at least one copolymer of vinylidene chloride, preferably in a weight ratio of about 3:1 to 1:1. The adhesive composition can furthermore contain cellulose acyl esters, such as low molecular-weight cellulose acetobutyrate or cellulose propionate. Polybasic oxycarboxylic acids and levelling agents can also be present. The adhesive composition can be employed in mixtures with, for example, light-sensitive lacquer systems.

19 Claims, No Drawings

ADHESIVE COMPOSITION

BACKGROUND OF THE INVENTION

The present invention relates to an adhesive composition suitable for use on a shaped part made of polyester, in particular a polyester film, the adhesive comprising a copolyester and optionally being combined with light-sensitive substances, fillers and pigments.

Shaped parts of linear polyesters, in particular polyethylene terephthalate, especially in the form of fibers, threads or films, have gained great importance. For example, polyester films are used as base materials for photographic films, drafting films or duplicating materials. After orienting and setting, they are distinguished by high mechanical strength, good chemical resistance and dimensional stability, which, in addition to other properties, explains their economic significance.

In the manufacture of coated polyester films, a problem arises in obtaining good adhesion between the support film and the layers to be applied, while at the same time being able to wind and unwind the coated materials without blocking occuring.

In diazo printing, for example, alkaline developing is necessary for the production of images after exposure under an original with a suitable UV-lamp in order to produce the diazo dyestuff in the areas which have not been exposed. The films are thus subjected to the action of water or water vapor and elevated temperatures in an alkaline medium. It is particularly important here for there to be a flawless, strong bond between the polyester film and the applied layer or layers.

The anchoring of polymeric materials on films, such as polyethylene terephthalate, presents great difficulties. If the layers additionally contain chemicals of the type present in photochemistry and diazo printing and are to be subjected to exposure and developing processes in which the adhesion strength of the layers is, according to experience, placed under great stress, the adhesive forces must be particularly strong in order to maintain the bond without any defects occurring. There has therefore been no lack of attempts to develop products which bring about an improved adhesion of the polyester film.

For example, German Pat. No. 971 996 (equivalent to British Pat. No. 700,957) discloses the use of highly polymeric polyesters as adhesion-promoting layers. It is also known (German Pat. No. 25 55 783, equivalent to U.S. Pat. No. 4,139,506) to employ, on polyester films, adhesive compositions which are composed of a mixture of copolyesters and polyisocyanate, optionally in combination with light-sensitive and other components, which contain an admixture of at least one cellulose ester, a copolymer of vinylidene chloride, a copolymer of methylvinyl ether and maleic acid anhydride or a copolymer of acrylic acid esters or methacrylic acid esters, or an admixture of hexamethoxymethyl melamine, the ratio of copolyester to admixture being in the range of 20:1 to 0.5:1.

When polyisocyanates are used as adhesive layer elements, however, either adhesive properties develop only after a certain storage period or the storability of the layers is reduced because they are sensitive to humidity or stick together. When the anchoring layers are heated to higher temperatures to counteract this disadvantage, they may turn yellow or cause incompatibility with the light-sensitive layer to be applied.

Copolyesters are themselves thermoplastic substances which under heat stress, as is customary in developing processes for copying materials, lose their adhesive power in an undesirable manner.

In connection with a two-component diazotype material comprising a support layer of polyethylene terephthalate and a binder-containing diazotype layer applied thereto, German Pat. No. 28 30 003 (equivalent to British Pat. No. 1,568,468) discloses the use of a binder composed of an adhesion-promoting copolymer of isophthalic acid and/or terephthalic acid, a glycol having 2 to 6 methylene groups and/or polyoxylakylene glycol.

However, it has been found that these layers cannot in all cases bear maximum stresses, such as occur, for example, in diazotype printing.

SUMMARY OF THE INVENTION

It is therefore an object of the present invention to provide an adhesive composition which is suitable for use on a shaped part of polyester, in particular a polyester film.

It is a particular object of the invention to provide such an adhesive which includes a copolyester, and which can, if appropriate, be used in combination with light-sensitive substances, fillers and pigments, without exhibiting the drawbacks of the known adhesion promotors.

Another object of the present invention is to provide an adhesive composition as above, wherein a strong bond between the polyester film and the applied layer or layers is maintained even when subjected to the action of water or water vapor in an alkaline medium at elevated temperatures.

Still another object of the present invention is to provide an adhesive composition as above, which can withstand the mechanical stress of the diazotype copying process.

Yet another object is to provide an adhesive composition which is compatible with the mixtures to be applied simultaneously or subsequently, such as, for example, light-sensitive layers.

Still a further object is to provide an adhesive composition which has immediately effective good adhesive power and which will not turn yellow during storage.

It is also an object of the invention to provide an improved copying or drafting material employing the adhesive composition according to the invention.

In accomplishing the foregoing objects, there has been provided in accordance with the present invention an adhesive composition suitable for use on a polyester surface, comprising a copolyester, at least one copolymer of vinylindene chloride, and optionally, light-sensitive substances, fillers or pigments. The adhesive may also contain cellulose acyl esters such as low-molecular-weight cellulose acetobutyrates or cellulose propionates. Polybasic oxycarboxylic acids such as citric acid may also be contained in the adhesive composition, in a weight ratio of up to 1:1 relative to the copolyester and copolymer of vinylidene chloride. A levelling agent may also be contained therein. The adhesive composition is applied to a support layer preferably comprising a polyethylene terephthalate film, and an external layer or layers comprising light-sensitive materials and possibly additional adhesive compound and other substances such as antistatic agents or pigments can be applied thereto in order to produce a light-sensitive product or a drafting film.

Further objects, features and advantages of the present invention will become apparent from the detailed description of preferred embodiments which follows.

DETAILED DESCRIPTION OF PREFERRED EMBODIMENTS

According to the invention, there has been provided an adhesive composition of the type mentioned at the outset, whereby the adhesive composition comprises a mixture of the copolyester and at least one copolymer of vinylidene chloride. Preferably, the weight ratio of the copolyester to the copolymer of vinylidene chloride is in a range of 3:1 to 1:1. An adhesive composition having a weight ratio of 2:1 is particularly advantageous.

The invention provides shaped parts of polyester carrying an adhesive layer which possess excellent adhesion-promoting properties. Another advantage presented by the adhesive composition according to this invention resides in the fact that it can be applied by an in-line process, i.e., prior to applying the subsequent layer, and thus continuous coating can be performed.

Polyester films provided with the adhesive composition according to this invention can, therefore, be very successfully coated with, for example, a light-sensitive layer. Immediately after coating and drying, a firm bond is achieved which to a high degree fulfills the requirements to be met in practical use.

The adhesive composition according to this invention is of particular importance if it furthermore contains a cellulose acyl ester. Low-molecular-weight cellulose acetobutyrates and cellulose propionates, either along or in mixtures, are preferably employed. The weight ratio of copolyester and copolymer of vinylidene chloride to cellulose acyl ester preferably is in a range of from about 1:1 to 1:100.

It has been discovered that adhesive layers can thus be made available, particularly on polyester films, which quite surprisingly fulfill highest demands. A strong bond could not be expected without the addition of the known, required reactive compounds, such as polyisocyanates.

Polyester films provided with the adhesive layer according to this invention are particularly suitable for use as support layers for diazo materials, in the light-sensitive layer of which there is, for example, contained a cellulose acyl ester as a binder, or for the production of drafting layers.

The adhesive layer according to this invention is applied in the form of an organic solution. In combination with cellulose acyl esters, suitable solvents are, for example, solvent mixtures of acetone, tetrahydrofuran and methyl glycol. If no cellulose acyl ester is present, methylethyl ketone can also be used as a solvent.

If films are coated, the dry weight of the adhesive layers is between about 0.1 and 1.0 g/m$^2$; if cellulose acyl ester is present, the dry layer weight is about 0.5 to 3 g/m$^2$. If a density of 1 is assumed, this corresponds to layer thicknesses of about 0.1 to 1.0 μm or 0.5 to 3 μm, respectively.

The copolyesters employed are polyester resins which represent copolyesters of, for example, iso- and terephthalic acid and one or several glycols and are commercially available, for example, under the tradenames DYNAPOL ®, made by Dynamit Nobel or VITEL ®, made by Goodyear. They are linear polyesters with mean molecular weights of up to about 20,000 and are composed of diols having 2 to 8 carbon atoms and dicarboxylic acids having 4 to 12 carbon atoms. These include ethylene glycol, diethylene glycol, propylene glycol, butylene glycol, neopentyl glycol, sebacic acid, azelaic acid, pimelic acid, adipic acid, glutaric acid, phthalic acid, isophthalic acid, terephthalic acid, alkylated phthalic acid, which are used alone or in mixtures.

Suitable copolymers of vinylidene chloride are the commercially available products known under the tradename of SARAN ®, made by Dow Chemical, which are for example, composed of vinylidene chloride and acrylonitrile or of vinylidene chloride, vinyl chloride and acrylonitrile in a broad variety of weight ratios, their mean molecular weights ranging beteen 10,000 and 20,000. Preferably, a copolymer of vinylidene chloride and acrylonitrile, in a weight ratio of 80:20, is employed.

The adhesive composition according to this invention advantageously contains an additional amount of polybasic oxycarboxylic acid. It has shown that this admixture achieves a stabilization of the adhesive bond in critical ranges of adhesion. Suitable compounds of this type are, for example, oxymalonic acid, mesoxalic acid, malic acid, tartaric acid, oxaloacetic acid, oxymaleic acid. Preferably, citric acid is employed as the polybasic oxycarboxylic acid. The polybasic oxycarboxylic acid may be added in small amounts, but weight ratios of up to about 1:1, relative to the copolyester and copolymer of vinylidene chloride, are possible.

In a further embodiment of the invention, the adhesive composition includes a levelling agent. The levelling agent is a compound based on organically modified polysiloxanes, e.g., a copolymer having dialkylsiloxane and oxyalkylene units, such as polyoxyethylene polymethylsiloxane. By its addition, a high degree of homogeneity of the coating is achieved.

The levelling agents used are known products which are commercially available, for example, under the tradename of TEGOPREN ®, made by Goldschmidt AG. They are soluble in organic solvents, such as alcohols, aliphatic and aromatic hydrocarbons, chlorinated hydrocarbons, ketones or esters. Products which are soluble both in water and organic solvents are also suitable. Preference is given to a polysiloxane which is soluble in water and in organic solvents. Its viscosity is within a range of about 800±150 mPa.s, at 25° C.

In the manufacture of repographic materials, light-sensitive lacquer systems for producing vesicular films or diazo films can be added to the adhesive composition according to the invention prior to applying the composition onto the polyester layer support. It is, however, also possible to incorporate the light-sensitive materials in a subsequent step into the adhesive compositions, by means of an in-line or off-line process, which from a point of view of process engineering brings about the advantage that the homogeneity of the layers obtained is substantially increased. This is because the amount of binder in the light-sensitive lacquer system can be reduced if the same binder as used for the adhesive composition is used for the lacquer system. The lacquer system can, therefore, contain a higher portion of active substance and be applied by a diffusion-type coating method. Due to the lower amount of cellulose acyl ester binder, the viscosity of the lacquer is considerably reduced, so that the application of the lacquer can be effected at a higher coating speed. By the application, the adhesive composition is simultaneously superficially dissolved, and thus an increased viscosity of the total lacquer is achieved, and the lacquer system has a higher viscosity when it is introduced into the drying channel. As a result of this, the layers obtained are more homogeneous than the layers applied using customary processes.

Shaped parts made of polyester, within the context of the invention, are preferably suitable layer supports. Most preferably, the support is a polyester material in the form of a film, which preferably is biaxially oriented.

The polyester films used as support materials are made of polybutylene terephthalate or copolyesters which are, for example, produced from terephthalic acid, isophthalic acid and ethylene glycol or 1,4-dimethylglycol cyclohexane, whereby the isophthalic acid proportion is up to 50 mole percent, or from terephthalic acid and ethylene glycol and polyethylene glycol, or from naphthalene-2,6-dicarboxylic acid, terephthalate acid and ethylene glycol. Polyethylene terephthalic films haved proved particularly suitable.

Apart from the compounds listed above, the adhesive composition can also contain fillers and pigments, for example, titanium dioxide, aluminum oxide, silicon dioxide, silicates or antistatic agents, dyestuffs, etc.

The adhesive composition according to this invention is applied from an organic solution, using conventional techniques. One or several further layers can be applied onto the adhesive layer, it being possible for each of these further layers additionally to contain an adhesive composition.

For example, layers can be applied which are also filled with inorganic pigments (aluminum oxide, titanium dioxide, $SiO_2$, silicates). Thus, surfaces which can be easily marked, for example, with graphite or plastic leads, are obtained. After treatment with a delustrant, it is furthermore possible to sensitize the surfaces, in a known manner, with diazonium salt solutions, to provide them with a coating which can be written on with India ink, or to use them as supports for toner images in an electrophotographic copying apparatus.

If required, the adhesive composition according to this invention can be dyed or provided with particles which prevent the occurrence of blocking effects during the winding-up of the films or reduce their tendency to stick together under the action of heat. A pigmented layer of adhesive composition can also be directly used as a matte surface for drafting or diazo materals. The layer of matting agent then preferably has a weight of from about 3 to 10 $g/m^2$.

Due to the good adhesion of the layer, the polyester film used as layer support need not be substrated.

The adhesion to the layer support and the mutual adhesion of the individual layers are excellent; this applies to adhesion in the dry and in the wet state.

The adhesive composition of this invention which is applied to shaped polyester parts, in particular polyester films, can, for example, be used for light-sensitive film materials, for a superficial modification of the films, for a cosmetic improvement of the surface, for an antistatic treatment, for subsequent dyeing or for hiding superficial defects, such as specks or scratches. Appropriately equipped polyester films can also be employed as image supports in electrophotography.

The invention will now be explained in greater detail by way of the following non-limiting examples.

EXAMPLE 1

A 125 μm thick, crystal-clear film of biaxially oriented polyethylene terephthalate is coated with a solution of the following composition: 1.15 g of a copolyester (DYNAPOL® L206) and 0.65 g of a copolymer (SARAN® F 310) are dissolved in 98.2 g of methylethyl ketone while stirring. After drying, the solution results in a clear film having a weight of 250 $mg/m^2$. The film thus obtained, which includes an adhesive layer, exhibits high adhesive forces toward the polyester film serving as the support film. It is used for the coating solutions described below (Examples 2 and 3).

EXAMPLE 2

A polyester film substrated as described in Example 1 was coated with a solution of the following composition: 12.7 g of vinylidene chloride/acrylonitrile copolymer in a weight ratio of 30:70 and 3.3 g of a vinylidene chloride/acrylonitrile copolymer in a weight ratio of 80:20, to which an admixture of 0.8 g of diazonium salt, 0.7 g of citric acid, slip agents and stabilizers was added, were dissolved in 83 g of methylethyl ketone while stirring. A material prepared in this way can be used as a vesicular film. For testing the adhesive strength of the coated film, the film was exposed to a UV light source and the layer was scored with a cross-hatch adhesion tester, type GS 30, in accordance with DIN 53 151. Then an adhesive tape was pressed onto the marked areas of the film and removed again with a jerk. The adhesion of the vesicular film to the polyester film pretreated as described in Example 1 is very good. Without pretreatment of the surface of the polyester film, the adhesion is unsatisfactory.

EXAMPLE 3

A solution suitable for film substration was prepared and applied in the form of an adhesive composition, as described in Example 1. To test the adhesive strength of the substration, a 3 to 5 μm thick layer of a microfilm lacquer containing cellulose propionate as the binder, a diazo compound customarily used to produce a blue dyestuff, a coupling agent and a stabilizer was applied and dried for 2 minutes at 105° C. In a copying apparatus, the film was then developed with ammoniacal water vapor at an elevated temperature and subjected to the adhesion test of Example 2. The adhesion was found to be very good. Without the substrated adhesion-promoting coating of this invention, the diazo film does not adhere to the polyester film.

EXAMPLE 4

A 175 μm thick biaxially oriented polyester film was coated with the following solution: 0.234 g of a copolyester prepared from terephthalic acid, neopentyl glycol and ethylene glycol, having a mean molecular weight of 18,000 to 20,000, 0.130 g of a vinylidene chloride/acrylonitrile copolymer in a weight ratio of 80:20, 10.0 g of a cellulose acyl ester having a propionyl content of about 45% and an acetyl content of about 3.5% at a viscosity of 150 to 240 mPa.s, measured according to DIN 53 015, were dissolved in a solvent mixture comprising 185 g of tetrahydrofuran, 48.5 g of methylglycol, and 5 g of methylethyl ketone. The solution has a viscosity of about 5 to 8 mPa.s and after application to a polyester film and drying it results in a clear film having a weight of 3 $g/m^2$, corresponding to a thickness of about 3 μm. This adhesive layer adheres very well to the polyester film.

EXAMPLE 5

The polyester film which had been substrated, as described in Example 4, with an about 3 μm thick adhesive composition of copolyester, vinylidene chloride copolymer and cellulose ester was provided with a top layer of the following composition: 0.1 g of sulfosalicylic acid, 1.3 g of a blue coupler, such as 2,3-dihydroxynaphthalene-6-(4'-chlorophenyl)-sulfonic acid amine, 2.3 g of a diazonium salt, such as 4-morpholino-2,5-dibutoxy-benzene diazonium fluoborate, 3.5 g of a cellulose ester as in Example 4, 50 mg of a levelling agent based on an organically modified polysiloxane (TEGOPREN ®) were dissolved in a solvent mixture of 94.9 g of acetone, 26.7 g of tetrahydrofuran and 28.9 g of methyl glycol, so that a solution having a viscosity of about 3 to 5 mPa.s was obtained. After drying for 2 minutes at 105° C., an applied layer weight of about 7 to 8 g/m$^2$ was obtained. The application could be performed at a coating speed of 30 to 40 m/min, while customary coating speeds are about 20 m/min. The top layer showed good adhesion. The layer produced was homogeneous.

EXAMPLE 6

The following solution was applied to a 125 μm thick, biaxially oriented support film of polyester: 7.8 g of cellulose acyl ester with a propionyl content of about 45% and an acetyl content of about 3.5% and having a viscosity of 150 to 240 mPa.s, measured according to DIN 53 015, and 3.7 g of a diazo mixture as in Example 5, for producing a blue dyestuff which comprised a diazonium salt, a coupler and a stabilizer, were dissolved in a solvent mixture of 94.4 g of acetone, 26.7 g of tetrahydrofuran and 28.9 g of methyl glycol. 4.1 g of a 1.82% strength solution of a copolyester (DYNAPOL ®) and a copolymer (SARAN ®), in a weight ratio of 2:1, in methylethyl ketone were stirred into this diazo lacquer.

The adhesive composition, which simultaneously is a diazo lacquer layer, showed very good adhesive properties after treatment with water vapor and ammonia and performance of the adhesion test described in Example 2. Without the addition of copolyester and copolymer the applied layer does not possess any adhesive strength.

EXAMPLE 7

50 mg of a levelling agent (TEGOPREN ® 1007) were added to the solution described in Example 6. The layer obtained had an improved homogeneity and, as a consequence thereof, a greater adhesive strength.

EXAMPLE 8

A solution of the following composition was applied to a 125 μm thick crystal-clear film of biaxially oriented polyethylene terephthalate: 4.0 g of a cellulose acyl ester having a propionyl content of about 45% and an acetyl content of about 3.5% and a viscosity of 150 to 240 mPa.s, measured according to DIN 53 015, 4.0 g of a cellulose ester having a propionyl content of about 45% and an acetyl content of about 3.5% and a viscosity of 2,200 to 3,800 mPa.s, measured according to DIN 53 015, 0.15 g of sulfosalicylic acid, 1.95 g of a coupler and 3.42 g of a diazonium salt as described in Example 5, were dissolved in a solvent mixture of 94.9 g of acetone, 26.7 g of tetrahydrofuran and 28.9 g of methyl glycol. 16.5 g of a 1.82% strength solution of a copolyester and a vinylidene chloride copolymer, in a ratio of 2:1, dissolved in methylethyl ketone, were stirred into this diazo lacquer system. After adding 50 mg of a levelling agent and 360 mg of citric acid, the clear solution obtained was applied to the polyethylene terephthalate film and dried. After developing in an ammoniacal water vapor medium, the crystal-clear diazo adhesive composition layer exhibited very good adhesion. Without the addition of citric acid, the dry and the wet adhesion of the layer was somewhat reduced under extraordinary strain, for example, the exposure to extremely high atmospheric humidity, the wet adhesion being tested by exposing the layer to water vapor prior to the dry adhesion test.

EXAMPLE 9

A 75 μm thick, biaxially oriented polyethylene terephthalate film was coated with the following solution:
4 g of a copolyester (DYNAPOL ® L206)
3 g of a copolymer (SARAN ® F310)
120 g of a methyl glycol acetate After drying the solution at 115° C., a film weighing about 600 mg/m$^2$ was obtained. The adhesive layer was coated with at 9 μm thick cellulose propionate film of acetone and alcohols, which contained 35% of a mixture of inorganic pigments having a mean grain size of 4.5 μm. The cellulose propionate used was an ester having a propionyl content of 45% and a viscosity of 200 mPa.s, measured according to DIN 53 015. The pigment mixture included aluminum oxide, synthesized silica, silicate and titanium dioxide. The film matted in this way could be well marked with graphite or plastic leads. Furthermore, this film was suitable as a support for toner images in an electrophotographic copying apparatus.

To test the resistance to ageing of the matte lacquer, a sample was stored for 6 days at 100° C. and 50% relative humidity. With the cross-hatch adhesion test described in Example 2, good lacquer adhesion was achieved.

EXAMPLE 10—COMPARATIVE

The film matted as described in Example 9 was coated with a solution typically used to produce a brown dyestuff, comprising a diazo compound, couplers and stabilizing admixtures, and dried at 100° C.

After developing of the material in a copying apparatus using a dry copying method, the lacquer adhesion was found to be very good.

In a parallel test, the same matte lacquer and the same diazo sensitizing solution were coated onto a film provided with an adhesion-promoting solution which contained, in addition to the ingredients of Example 9, 1.5 g of diisocyanate, in the form of a 75% strength solution in butyl acetate (DESMODUR ® L75) (analogously to the teaching of German Pat. No. 25 55 783). This second sample (comparative sample) also exhibited a very good lacquer adhesion.

After storage of the two samples for 3 days at 55° C. and 35% relative humidity and subsequent exposure and developing, the comparative sample showed a stronger coloration in the exposed areas than the sample containing the adhesion promoter according to the invention.

EXAMPLE 11

A 75 μm thick, biaxially oriented polyethylene terephthalate film was coated with the following solution:
5 g of a linear, saturated, hydroxy group-containing polyester resin (DYNAPOL® LH 812),
3 g of a ketone-soluble vinylidene chloride/acrylonitrile copolymer (SARAN® F 310),
140 g of acetone,
14 g of 3-methoxy-n-butyl acetate.

The solution was dried to give a film having a weight of 0.5 g/m², then the adhesive composition was coated with a matte lacquer as described in Example 9 and dried for 3 minutes at 110° C. The lacquer adhesion was good. When the ketone-soluble vinylidene chloride copolymer admixture is omitted, the adhesion of the matting layer is poor.

EXAMPLE 12

As described in Example 11, a 125 μm thick polyethylene terephthalate film was coated with the following solution:
13 g of a linear, hydroxyl group-containing polyester resin (DYNAPOL®)
5 g of a vinylidene chloride/acrylonitrile copolymer (SARAN® F 310),
680 g of acetone,
80 g of methanol.

The layer was applied in such a way that a dry weight of 0.22 g/m² resulted and dried at 120° C. This adhesive composition was coated with a matte lacquer of
8 g of cellulose ester (CELLIT® PR 500, Bayer)
2 g of a vinyl acetate copolymer (MOWILITH® 70, Hoechst)
5 g of inorganic pigments (Satintone Spezial, Bayertitan RFD 1)
70 g of acetone,
20 g of alcohol,
so that a lacquer layer of about 9 μm thickness was obtained. To test the lacquer adhesion after the action of moisture, a sample of the matted film was stored in water for 24 hours. After drying of the surface, the lacquer adhesion was excellent.

EXAMPLE 13

A 125 μm thick, biaxially oriented polyester film was coated with the following pigmented adhesive composition:
50 g of a polyester resin (DYNAPOL® LH 812)
45 g of a cellulose acetopropionate (mixture of CAP 482-20 and CAP 482-0.5),
15 g of a vinyl acetate copolymer (MOWILITH® 70),
10 g of a vinylidene chloride copolymer (SARAN® F 310),
30 g of silica-containing pigments having a mean particle size of 4 μm,
600 g of acetone,
170 g of an alcohol mixture.
in a way such that a lacquer layer having a weight of 9 g/m² resulted after drying at 130° C. This layer, which contained the adhesive composition according to this invention in combination with the matting layer, has excellent adhesion properties and can be used as a toner image support for electrophotographic copying apparatuses.

What is claimed is:

1. An adhesive composition suitable for use on a polyester surface, consisting essentially of:
    a copolyester, said copolyester comprising linear polyesters having molecular weights up to about 20,000 and being the reaction product of diols having from 2 to 8 carbon atoms; and dicarboxylic acids having from 4 to 12 carbon atoms; and
    at least one copolymer of vinylidene chloride.

2. An adhesive composition as in claim 1, wherein the polyester part comprises a biaxially oriented film.

3. An adhesive composition as in claim 1, wherein the weight ratio of copolyester to the copolymer of vinylidene chloride is between about 3:1 and 1:1.

4. An adhesive composition as in claim 1, further comprising a cellulose acyl ester.

5. An adhesive composition as in claim 4, wherein the cellulose acyl ester comprises a low-molecular-weight cellulose acetobutyrate or cellulose propionate or a mixture thereof.

6. An adhesive composition as in claim 4, wherein the weight ratio of copolyester and copolymer of vinylidene chloride to cellulose acyl ester is within a range of from about 1:1 to 1:100.

7. An adhesive composition as in claim 1, further comprising a polybasic oxycarboxylic acid.

8. An adhesive composition as in claim 7, wherein the oxycarboxylic acid comprises citric acid.

9. An adhesive composition as in claim 1, further comprising a levelling agent.

10. An adhesive composition as in claim 9, wherein the levelling agent comprises a copolymer having dialkylsiloxane and oxyalkylene units 11. An adhesive composition as in claim 1, wherein the dry weight of an adhesive layer coated on film is between about 0.1 and 1 g/m².

12. An adhesive composition as in claim 4, wherein the dry weight of an adhesive layer coated on film is between about 0.5 and 3 g/m².

13. An adhesive composition as in claim 1, wherein the copolyester comprises iso- or terephthalic acid, and at least one glycol.

14. An adhesive composition as in claim 1, wherein the copolymer of vinylidene chloride comprises vinylidene chloride and acrylonitrile, in a weight ratio of about 80:20.

15. An adhesive composition as in claim 7, wherein the polybasic oxycarboxylic acid comprises oxymalonic acid, mesoxalic acid, malic acid, tartaric acid, oxaloacetic acid, or oxymaleic acid.

16. An adhesive composition as in claim 7, wherein the polybasic oxycarboxylic acid is contained in a weight ratio of up to about 1:1 relative to the copolyester and copolymer of vinylidene chloride.

17. A drafting layer comprising a polyester support layer and a coating therein of an adhesive composition as in claim 1.

18. A light-sensitive lacquer system for the production of diazo materials comprising an adhesive composition as in claim 1 and a light-sensitive compound.

19. A light-sensitive member, comprising a support layer comprised of biaxially oriented polyester film, and a layer thereon of a light sensitive lacquer system as defined in claim 18.

* * * * *